United States Patent [19]
Kanno et al.

[11] Patent Number: 6,097,510
[45] Date of Patent: *Aug. 1, 2000

[54] IMAGE PROCESSING APPARATUS AND METHOD

[75] Inventors: Akiko Kanno, Yokohama; Akio Suzuki; Yoshinobu Umeda, both of Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/382,807

[22] Filed: Feb. 2, 1995

[30] Foreign Application Priority Data

Feb. 4, 1994 [JP] Japan .................................. 6-012742
Mar. 31, 1994 [JP] Japan .................................. 6-062964

[51] Int. Cl.$^7$ ........................................................ H04N 1/46
[52] U.S. Cl. .......................... 358/518; 358/532; 358/538
[58] Field of Search ........................... 358/512, 515, 358/518, 520, 530, 531, 532, 537, 538, 452, 453, 458, 461; 382/266, 275, 166, 167, 162

[56] References Cited

U.S. PATENT DOCUMENTS

| 4,855,765 | 8/1989 | Suzuki et al. | 346/154 |
| 5,138,443 | 8/1992 | Ikeda et al. | 358/80 |
| 5,251,023 | 10/1993 | Arimoto et al. | 358/529 |
| 5,485,529 | 1/1996 | Kurita et al. | 358/500 |
| 5,555,093 | 9/1996 | Nagashima | 358/296 |

FOREIGN PATENT DOCUMENTS

| 0344976 | 6/1989 | European Pat. Off. | H04N 1/387 |
| 3021173 | 1/1991 | Japan | H04N 5/278 |

OTHER PUBLICATIONS

"Unda: First of a New Generation of Color Systems", Seybold Report On Publishing Systems, vol. 19, No. 3, pp. 1–24, Oct. 9, 1989, USA ISSN: 0763–2260.

*Primary Examiner*—Jerome Grant, II
*Attorney, Agent, or Firm*—Fitzpatrick, Cella, Harper & Scinto

[57] ABSTRACT

The invention is directed toward an image processing apparatus with a first and second image input using a synthesizer for synthesizing the image input according to a ration and forming the image. A display unit including keys are used to control the display unit and select a color for fine adjustment.

5 Claims, 22 Drawing Sheets

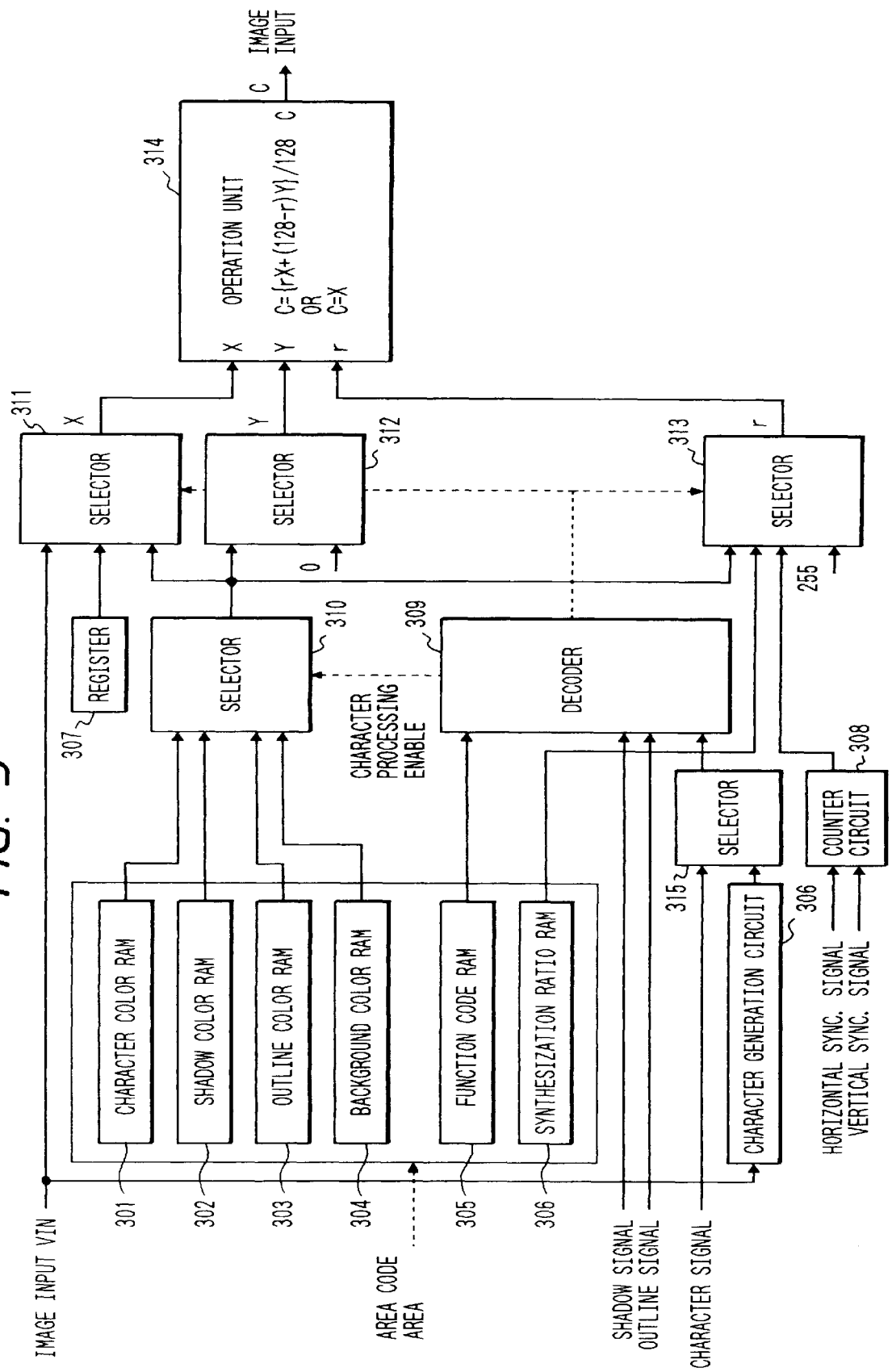

FIG. 4

| EXAMPLE OF FUNCTION | CHARACTER PROCESSING ENABLE | SELECTOR 311 OUTPUT | SELECTOR 312 OUTPUT | SELECTOR 313 OUTPUT | SELECTOR CHANGE |
|---|---|---|---|---|---|
| NORMAL IMAGE (THROUGH) | — | IMAGE SIGNAL | FIXED AT 0 | FIXED AT 255 | ENTIRE AREA |
| TRANSPARENT PAINT (COLOR FILTER) | — | IMAGE SIGNAL | BACKGROUND COOLOR | SYNTHESIZATION RATIO | ENTIRE AREA |
| GRADATION FILTER | — | IMAGE SIGNAL | BACKGROUND COOLOR | COUNTER OUTPUT | ENTIRE AREA |
| PAINT | — | REGISTER | FIXED AT 0 | FIXED AT 255 | ENTIRE AREA |
| GRADATION PAINT | — | REGISTER | BACKGROUND COOLOR | COUNTER OUTPUT | ENTIRE AREA |
| BASE COLOR | CHARACTER | IMAGE SIGNAL | BACKGROUND COOLOR | SYNTHESIZATION RATIO FIXED AT 255 | AREA+ CHARACTER SIGNAL |
| CHARACTER COLORING | CHARACTER | IMAGE SIGNAL CHARACTER COLOR | FIXED AT 0 | FIXED AT 255 | AREA+ CHARACTER SIGNAL |
| SHADING/OUTLINE | DESIGNATED ONE OF CHARACTER, SHADOW AND OUTLINE | IMAGE SIGNAL CHARACTER/ SHADOW/OUTLINE COLOR | FIXED AT 0 | FIXED AT 255 | AREA+CHARACTER/ SHADOW/OUTLINE SIGNAL |
| COLORED SOLID CHARACTER (SHADOW/OUTLINE) | DESIGNATED ONE OF CHARACTER, SHADOW AND OUTLINE | BACKGROUND COLOR CHARACTER/SHADOW/OUTLINE COLOR | FIXED AT 0 | FIXED AT 255 | AREA+CHARACTER/ SHADOW/OUTLINE SIGNAL |
| GRADATION COLORED SOLID CHARACTER | DESIGNATED ONE OF CHARACTER, SHADOW AND OUTLINE | REGISTER CHARACTER/ SHADOW/OUTLINE COLOR | BACKGROUND COOLOR FIXED AT 0 | COUNTER OUTPUT FIXED AT 255 | AREA+CHARACTER/ SHADOW/OUTLINE SIGNAL |

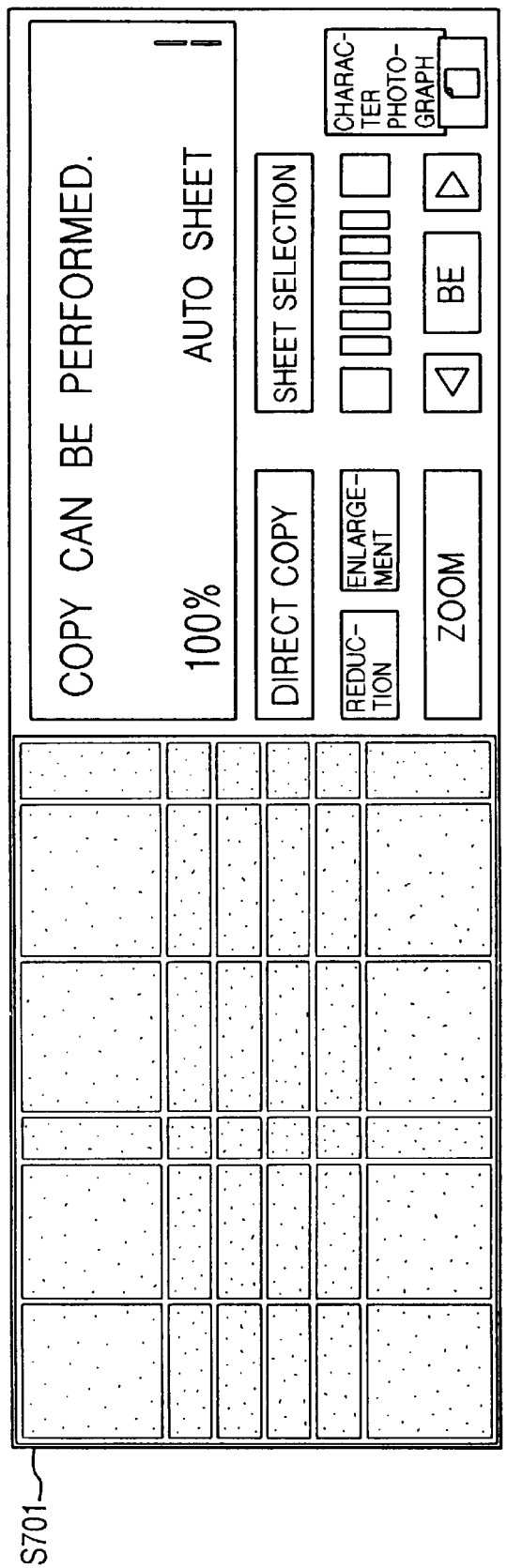

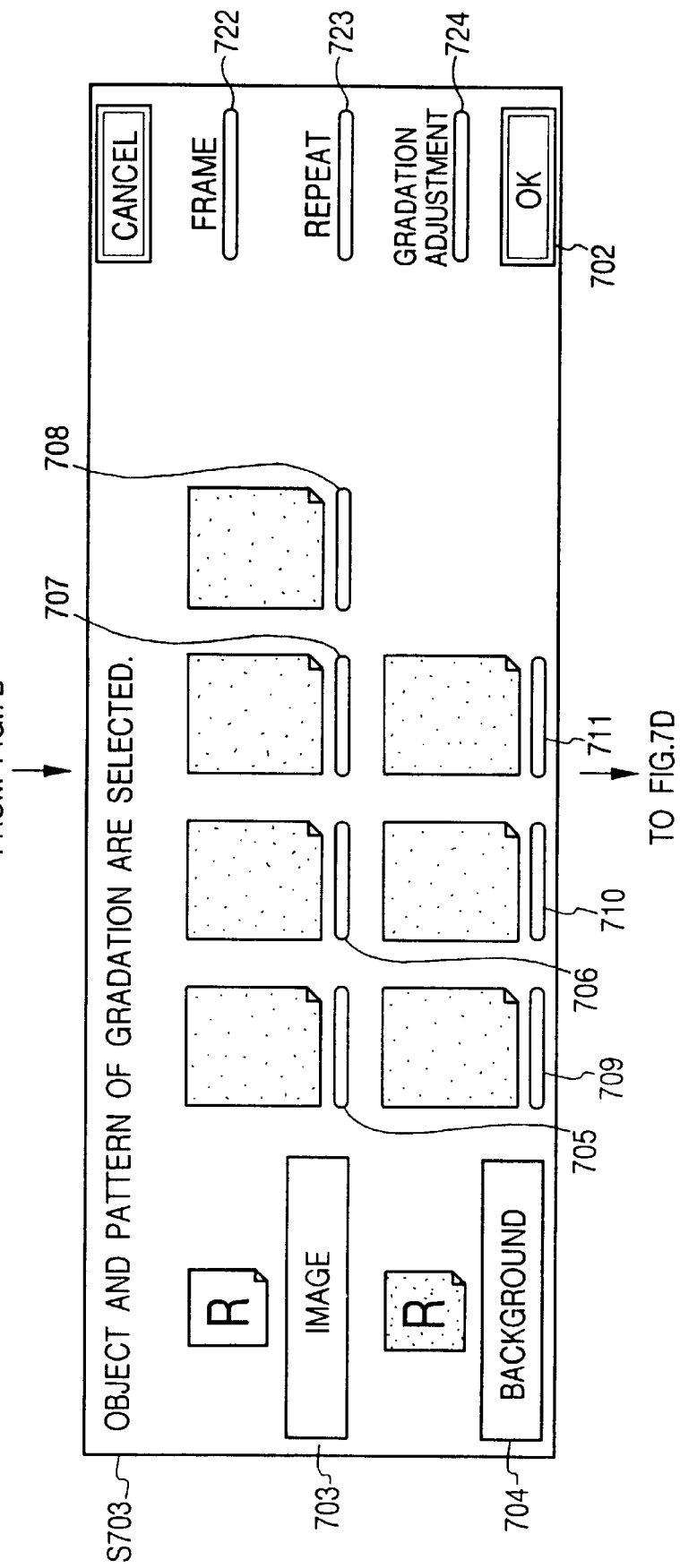

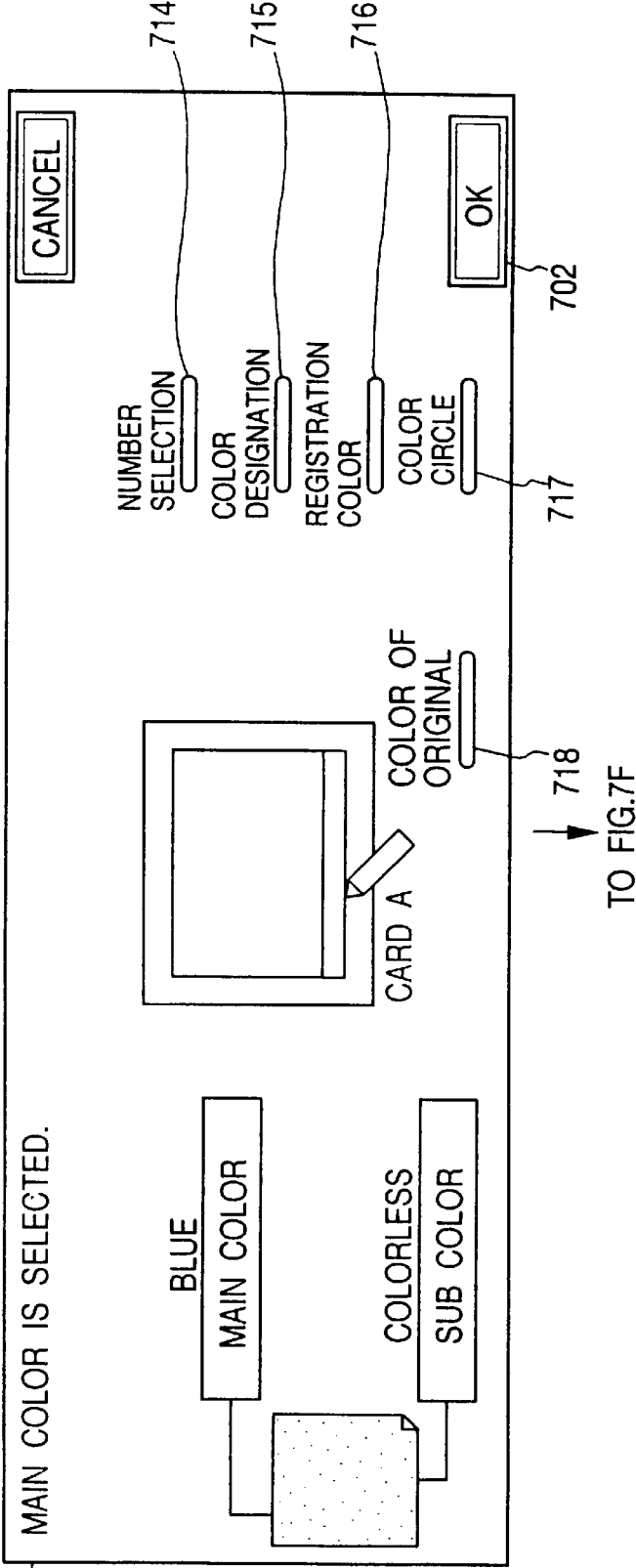

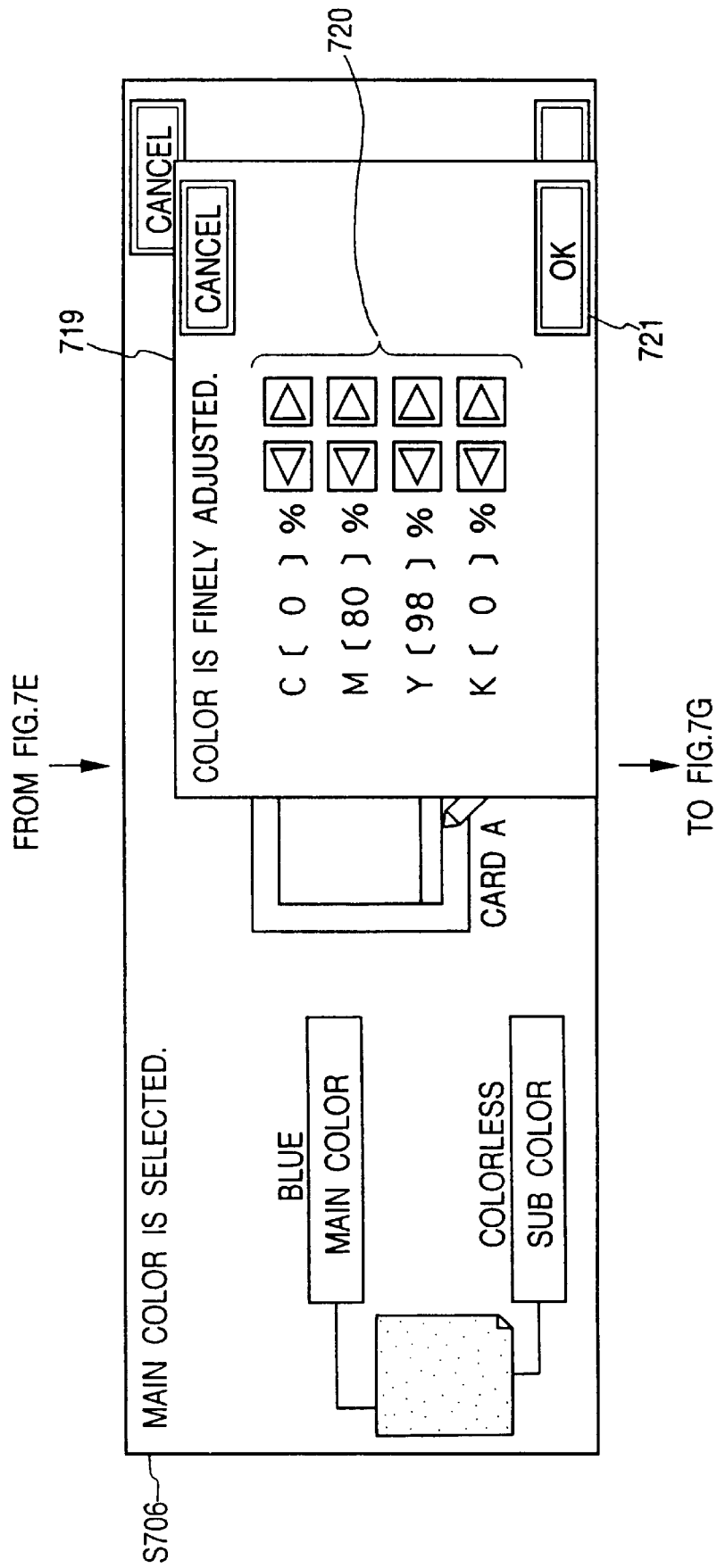

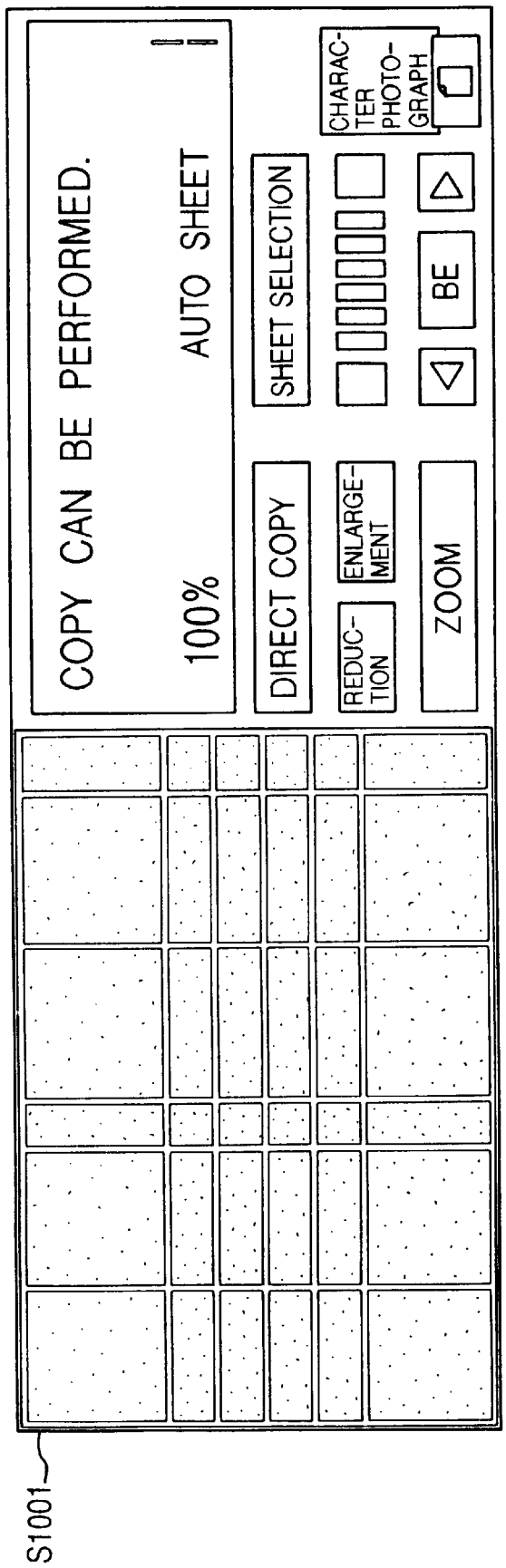

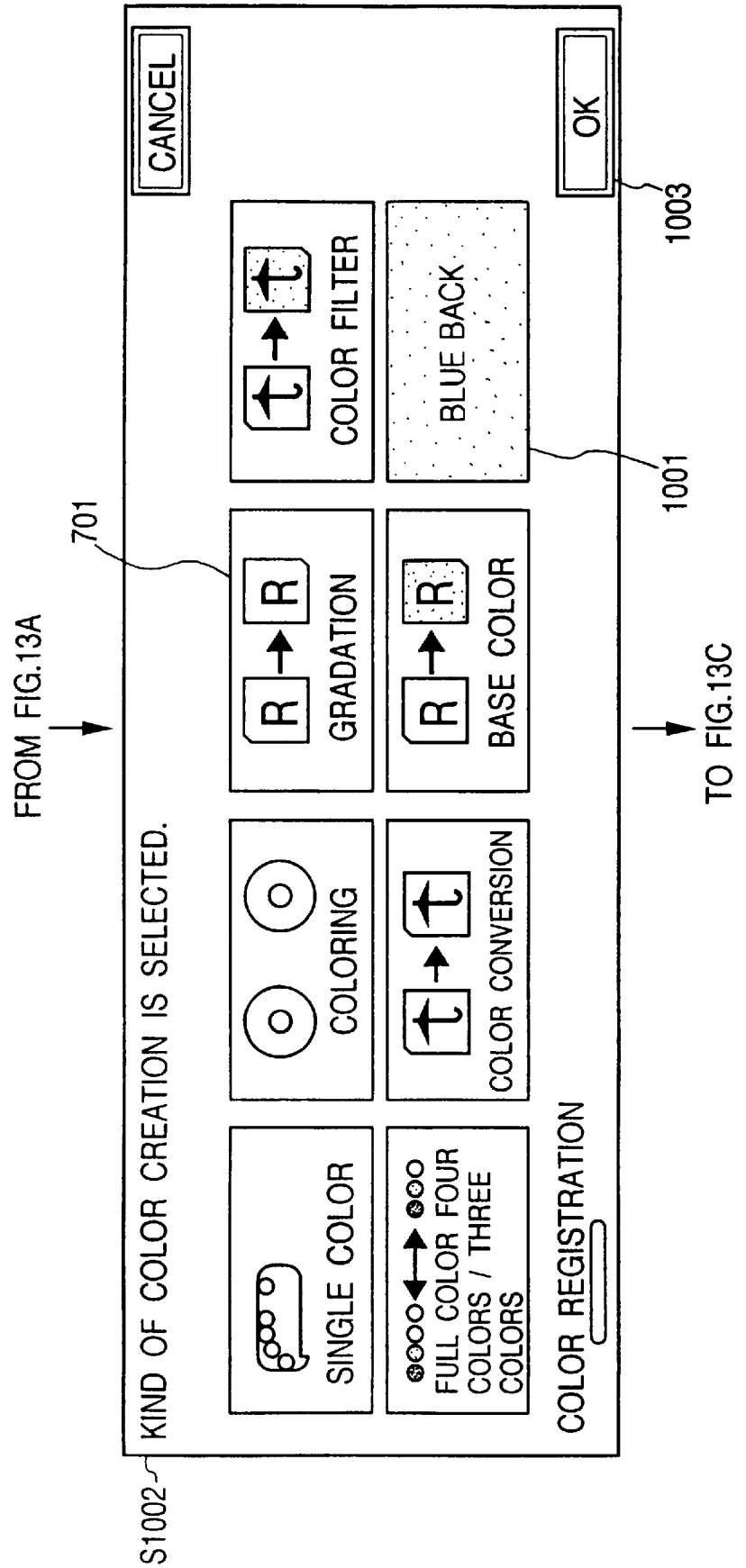

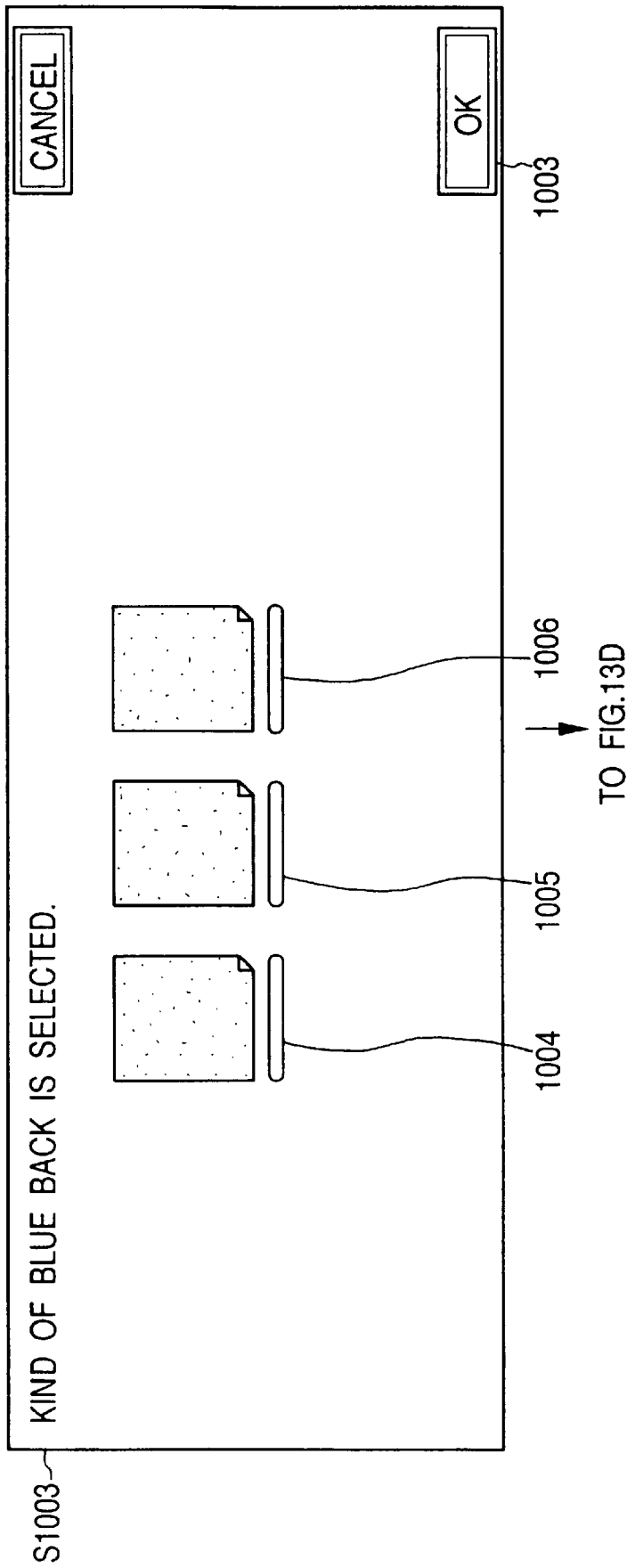

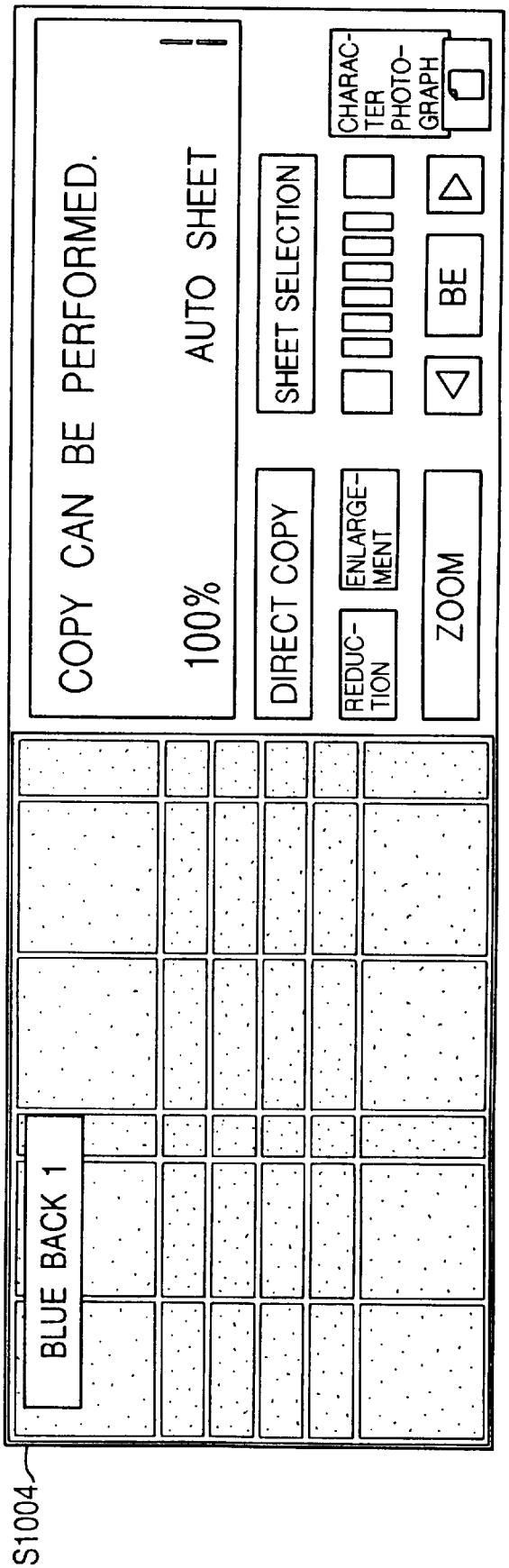

IMAGE PROCESSING APPARATUS AND METHOD

BACKGROUND OF THE INVENTION

1. Field of the Invention

The present invention relates to an image processing apparatus and method and, more particularly, to color processing (decoration processing) of image data and operability for performing this processing.

2. Related Background Art

Popular "color creation" functions of coloring and decorating a monochrome image are a "paint function" of painting an image solid in a designated color, a "base color function" of coloring only a non-image portion, a "coloring function" of coloring only an image portion, a "single color function" for replacing a color with a single color except for black, a "color window function" of coloring image and non-image portions in different colors, and the like.

The conventional functions are the functions using replacement of the color of an original with a specific color and do not have any functions of gradually changing colors and making an original image and a paint color transparent.

SUMMARY OF THE INVENTION

It is an object of the present invention in consideration of the above background to provide an image processing apparatus capable of performing high-performance image editing by new image processing (decoration processing) such as "transparent gradation" described above.

In order to achieve the above object, there is provided according to an aspect of the present invention, an image processing apparatus comprising first input means for inputting a first image signal, second input means for inputting a second image signal, means for designating an image area, and means for synthesizing the first and second image signals while controlling a synthesization ratio thereof in accordance with an output from the designating means.

According to another aspect of the present invention, there is provided an image processing apparatus comprising first input means for inputting an image signal, second input means for inputting a signal representing a first specific color, third input means for inputting a signal representing a second specific color, first synthesizing means for synthesizing the signals representing the first and second specific colors while controlling a synthesization ratio thereof, and second synthesizing means for synthesizing the image signal with an output signal from the first synthesizing means.

According to still another aspect of the present invention, there is also provided an image processing apparatus comprising first input means for inputting an image signal, second input means for inputting a signal representing a specific color, and means for synthesizing the image signal and the signal representing the specific color while controlling a synthesization ratio thereof.

According to still another aspect of the present invention, there is provided an image processing apparatus comprising first input means for inputting a first image signal, second input means for inputting a second image signal, means for synthesizing the first and second image signals while controlling a synthesization ratio thereof, and image forming means for forming an image on the basis of an image signal synthesized by the synthesizing means.

It is another aspect of the present invention to provide an image processing apparatus whose operability is improved in performing the high-performance image processing described above.

In order to achieve this object, there is provided according to an aspect of the present invention, an image processing apparatus for performing image processing using a specific color selected by selecting means, comprising a display unit arranged in the selecting means to display a soft key, and a control unit for displaying, on the display unit, a first soft key for selecting a color or a second soft key for finely adjusting a color selected by the first soft key, wherein the control unit causes the display unit to display the second soft key in accordance with selection of the color selected by the first soft key.

Other objects, features and advantages of the invention will become apparent from the following detailed description taken in conjunction with the accompanying drawings.

BRIEF DESCRIPTION OF THE DRAWINGS

FIG. 3 is a block diagram showing the internal arrangement of a CMYK editing circuit 207;

FIG. 4 is a table for explaining mode settings in various editing modes;

FIG. 13 is comprised of FIGS. 13A to 13D showing views for explaining changes in display screen of the liquid crystal display unit 616 in a blue back setting mode of the second embodiment.

DETAILED DESCRIPTION OF THE PREFERRED EMBODIMENTS

Preferred embodiments of the present invention will be described below with reference to digital full-color copying machines in conjunction with the accompanying drawings.

Figure 1:
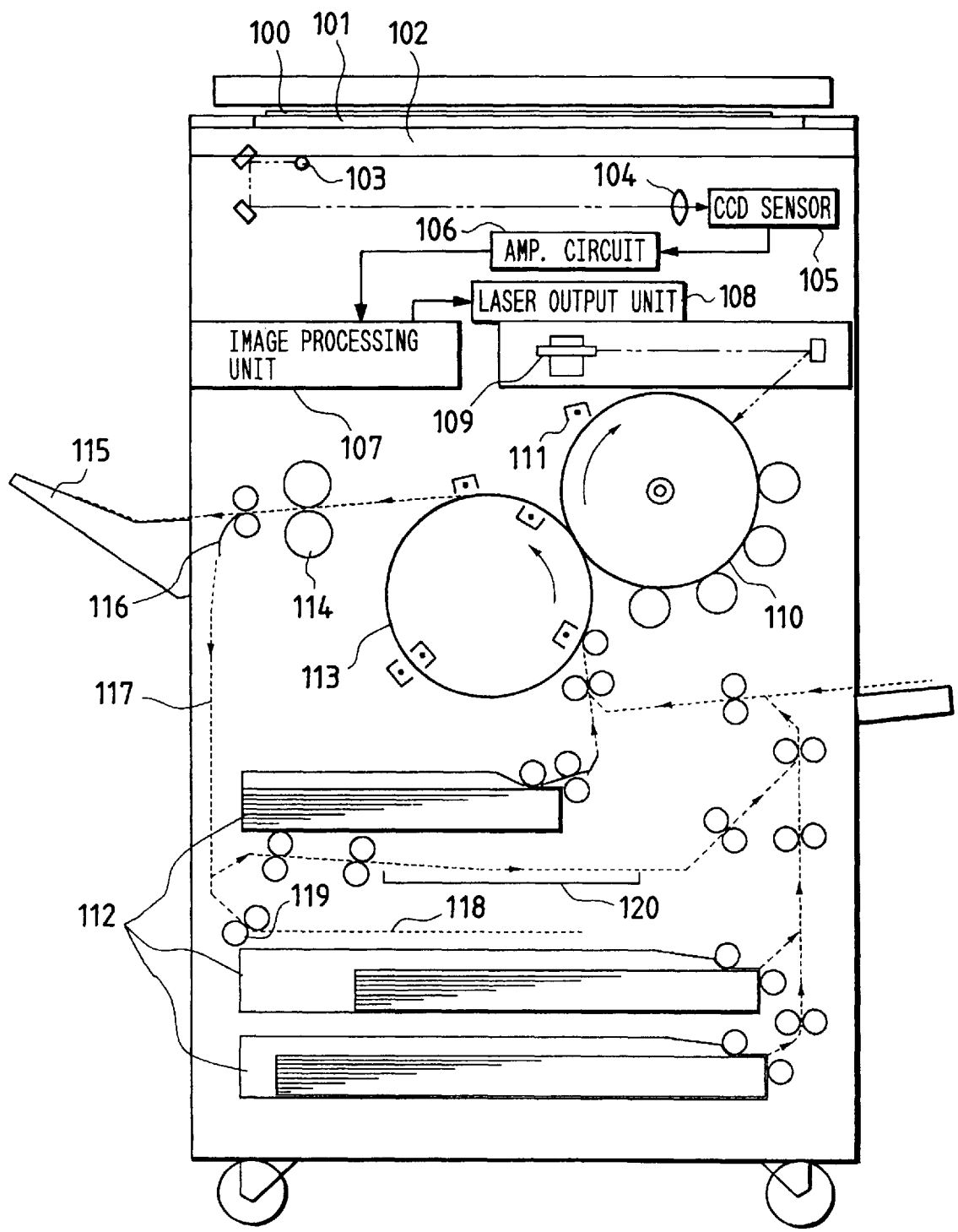
FIG. 1 is a schematic view of a digital color copying machine according to an embodiment of the present invention.

FIG. 1 is a schematic view of a digital color copying machine according to an embodiment of the present invention.

In this embodiment, the digital color copying machine comprises a digital color image reader unit in the upper portion and a digital color image printer unit in the lower portion.

In the reader unit, an original 100 is placed on an original table glass 101, and a start key of an operation unit 102 is operated to copy the original 100.

When the start key-of the operation unit 102 is operated, the original is exposed and scanned with an exposure lamp 103. An optical image reflected by the original 100 is focused on a full-color sensor (3-line CCD in this embodiment) 105 by a lens 104, thereby obtaining color-separated image signals. The color-separated image signals are subjected to image processing (to be described later) in an image processing unit 107 through an amplifier circuit 106. The processed data is sent to the printer unit.

In the printer unit, the image signal from the reader unit is converted into a laser beam signal by a laser output unit 108, reflected by a polygon mirror 109, and projected on the surface of a photosensitive drum 110. In image formation, the photosensitive drum 110 is rotated in a direction indicated by an arrow and uniformly charged by a charger 111. Each color-separated optical image is irradiated on the photosensitive drum 110 to form a corresponding latent image.

Each latent image is developed upon operation of a predetermined developing unit to form a corresponding toner image on the photosensitive drum 110. This toner image is transferred to a recording medium supplied from a recording medium cassette 112 to a position opposing the photosensitive drum 110 through a convey system and a transfer unit 113. The toner image on the photosensitive drum 113 is transferred onto the recording medium while rotating the transfer drum 113. In this manner, a predetermined number of color images are transferred to the recording medium to obtain a full-color image.

In full-color image formation, upon completion of transfer of the four color toner images as described above, the recording medium is separated from the transfer drum 110 and delivered onto a tray 115 through a fixing unit 114.

In formation of images on both the surfaces of a recording medium, after the recording medium is delivered from the fixing unit 114, a convey path selection guide 116 is immediately driven to temporarily guide the recording medium to a reverse path 118 through a vertical convey path 117. Upon reverse rotation of reverse rollers 119, the recording medium is delivered in a direction opposite to the feed direction such that the trailing end of the fed recording medium becomes the leading end. The recording medium is then stored in an intermediate tray 120. An image is then formed on the other surface of the recording medium in the same image formation process as described above.

Figure 2:
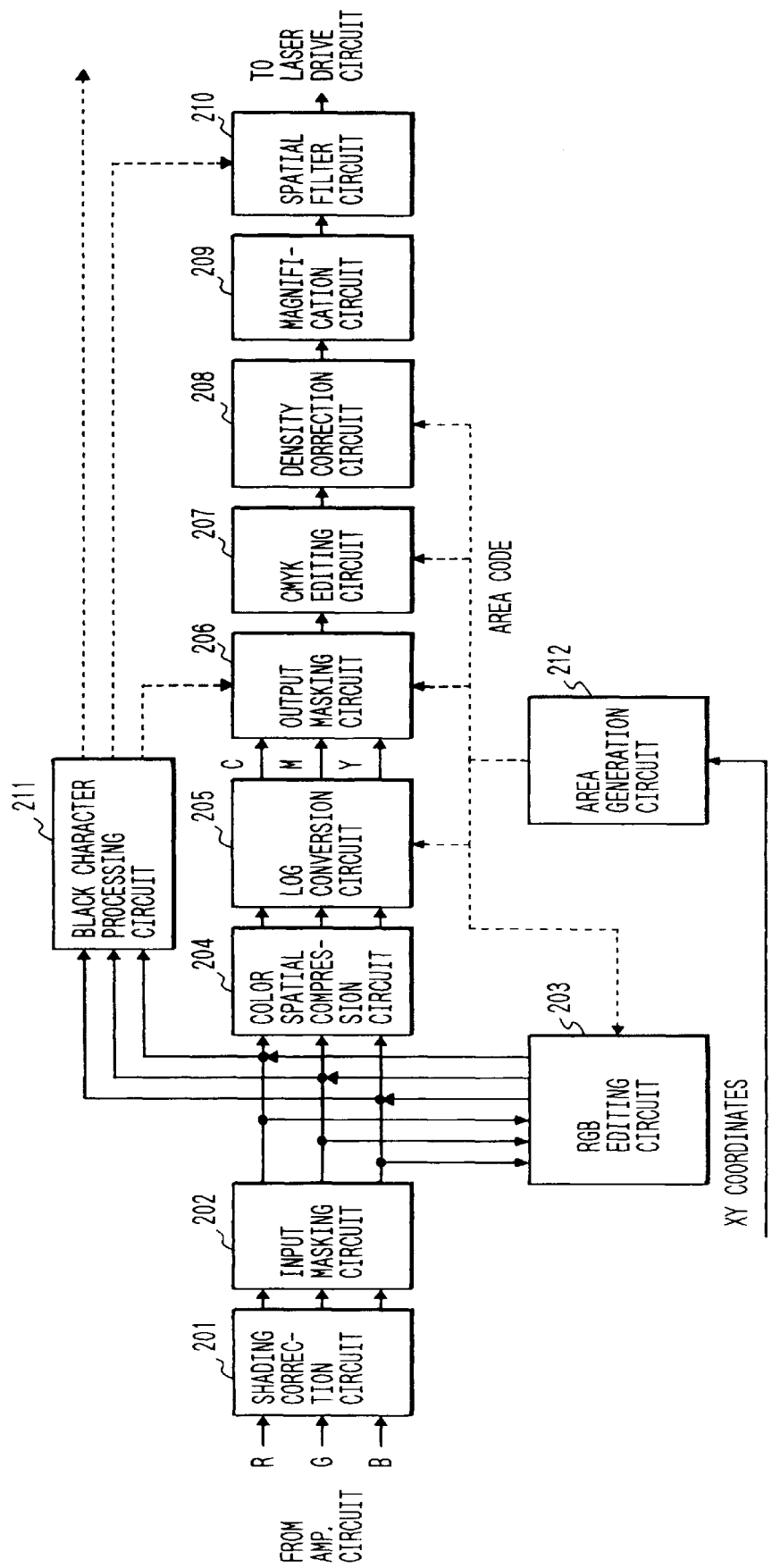
FIG. 2 is a block diagram showing the internal arrangement of an image processing unit 107.

FIG. 2 is a block diagram showing the internal arrangement of the image processing unit 107 in FIG. 1.

Referring to FIG. 2, the image processing unit 107 comprises a shading correction circuit 201, an input masking circuit 202, an RGB editing circuit 203, a spatial compression circuit 204, a light amount-density conversion (to be referred to as LOG conversion hereinafter) circuit 205, an output masking circuit 206, a CMYK editing circuit 207, a density correction circuit 208, a magnification circuit 209, a spatial filter circuit 210, a black character processing circuit 211, and an area generation circuit 212.

The processing operations of the image processing unit having the above arrangement will be described below.

Images read by the CCD 105 and converted into digital image signals R, G, and B by the amplifier circuit 106 are subjected to correction for any gradient in the light distribution of the lamp or light source 103 and variations of sensors in the shading correction circuit 201.

The digital image signals corrected by the shading correction circuit 201 are converted into three signals representing a standard color space (e.g., NTSC-RGB) in the input masking circuit 202, and the converted signals are input to the RGB editing circuit 203. Some of the editing processing operations such as color conversion, image synthesis with an image from an external device, and character processing signal generation for the three converted signals are performed in the RGB editing circuit 203.

The spatial compression circuit 204 compresses the color space so as to cause the color space to fall within the color reproduction range of the printer unit without degrading the tint of the original. The LOG conversion circuit 205 converts the image signals R, G, and B represented by the light amounts into three density signals C (cyan), M (magenta), and Y (yellow).

The next output masking circuit 206 frame-sequentially outputs one color signal which constitutes an image and are included in C, M, Y, and Bk (black) obtained upon conversion in accordance with the spectral characteristics of the toners.

The image signal is subjected to functions such as a paint function and a coloring function in the CMYK editing circuit 207. The image signal is output to a laser drive circuit through the density correction circuit 208, the magnification circuit 209, the spatial filter circuit 210.

On the other hand, the thickness, edge, and tint of an image are detected from the image signals R, G, and B in the black character processing circuit 211. The coefficients of the output masking circuit 206 and the spatial filter circuit 210, and the number of lines of the laser drive circuit are changed in accordance with the detection results of the black character processing circuit 211.

The area generation circuit 212 generates an area signal in accordance with designation by a digitizer (to be described later) or a marker.

Note that marker designation is designating a desired area of an original with a marker pen to perform partial editing.

FIG. 3 is a block diagram showing the internal arrangement of the CMYK editing circuit 207 in FIG. 2.

Referring to FIG. 3, the CMYK editing circuit 207 comprises RAMs 301 to 306 for storing colors (64 colors in this embodiment) of characters, shades, outlines, and backgrounds, and function codes and synthesization ratios equal in number to the number of areas (64 in this embodiment), a register 307 for storing the density data of colors to be painted, a counter circuit 308 for gradually changing color ratio values so as to generate gradation, a decoder 309 for generating a control signal for changing selectors 310 to 313 in accordance with the function code, the character signal, the shade signal, and the outline signal, and the selectors 310 to 313 changed in accordance with an output from the decoder 309.

An operation unit 314 performs the following arithmetic operation:

$$C = \{rX + (128-r)Y\}/128 \quad (1)$$

(for 0<r<128) or $$C = X \quad (2)$$

in accordance with input signals X, Y, and r from the selectors 311, 312, and 313, and outputs an image output signal.

Equation (2) is forcibly selected when r=255 is input to the operation circuit 314.

The CMYK editing circuit 207 also includes a selector 315 and a character generation circuit 316 for generating a character signal therein.

The processing examples of the main blocks (FIG. 3) in the respective editing modes of this embodiment are shown in FIG. 4.

In this case, ①a normal image, ②paint, ③transparent paint, and ④gradation paint will be described below.

① Normal Image (through without editing)

The output X from the selector 311 becomes a total screen image signal VIN. Character processing is completely disabled. The output Y from the selector 312 is set to 0, and the output r from the selector 313 is set to r=255. Equation (2) is selected by the operation circuit 314 to perform an operation C=X. In this case, the image input signal is directly output.

② Paint (painting of an entire given area)

The background color RAM 304 sets a paint color at an address representing an area to be painted. A code representing "paint" is set at an address of the function code RAM 305 which is identical to that of the RAM 304. The code is converted into a control signal by the decoder 309, and character processing is disabled. X=background color, Y=0, and r=255. A predetermined area can be painted in a predetermined color.

③ Transparent Paint (color filter)

In the example of Paint ②, an arbitrary value r is set at an address representing this area in the synthesization ratio RAM 306. A code representing "color filter" is set at an address of the function code RAM 305 which is identical to that of the RAM 306 to select r set in place of r=255 set by the selector 313. Therefore, the transparent paint can be performed. Note that X in equation (1) represents an input image signal; Y, a color signal representing the background color; and r, a set coefficient.

Although Y is defined as a color signal in the above example. However, the following operation may be performed. A memory for storing an image signal from an image input VIN is arranged in the block diagram of FIG. 3. An output from this memory is input to the selector 310, and a code representing "transparent image" is set in the function code RAM 305. The decoder 309 controls the selectors 310, 311, and 312 in accordance with this code, so that transparent synthesis between the image signal stored in the image memory and a newly input image signal can be performed.

④ Gradation Paint (shade and outline processing is performed for a character portion in an image, and its background is painted with gradation)

The character, shade, and outline are enabled in the function code RAM 305, and a code representing (gradation) is set. The colors of the character, shade, and outline, and one of the two colors of the gradation are set in the RAMs 301 to 304, respectively.

In this case, the decoder 309 selects X=register, Y=background color, and r=counter output for a portion other than the character/shade/outline signal. A synthesization ratio r for gradually changing the color of the register and the background color is calculated by the counter, and an image (gradation image) in which the color changes gradually is obtained. The kinds of grades are seven (FIGS. 5A to 5G), and a desired grade can be selected. In addition, the width and pitch of a change can also be set.

On the other hand, when at least two signals represent portions each represented by any one of the character signal, the shade signal, and the outline signal are input, the decoder 309 selects one of the outline, the character, and the shade in a priority order of "outline>character>shade". The selector 310 selects a corresponding one of the color RAMs 301 to 303.

At this time, X=character/shade/outline color, Y=0, and r=255 are selected. The operation unit 314 selects equation (2) to obtain C=X. Therefore, only a "character (shade/outline)" portion is painted in a "character (shade/outline)" color.

Note that the character signal can be generated as follows in addition to generation in an external circuit. That is, an ND (neutral density) signal is generated by the output masking circuit 206 (FIG. 2) connected to the input to the image input VIN, and the ND signal is input to the character generation circuit 316. A character signal is generated by the character generation circuit 316 in accordance with the ND signal. Alternatively, a character signal generated by the external circuit and a character signal generated by the character generation circuit 316 may be selectively switched by the selector 315.

Note that the functions are not limited to the ones shown in FIG. 4. Various functions such as coloring of only a character portion in an original image with gradation can be realized by combinations of selector settings.

Figure 6:
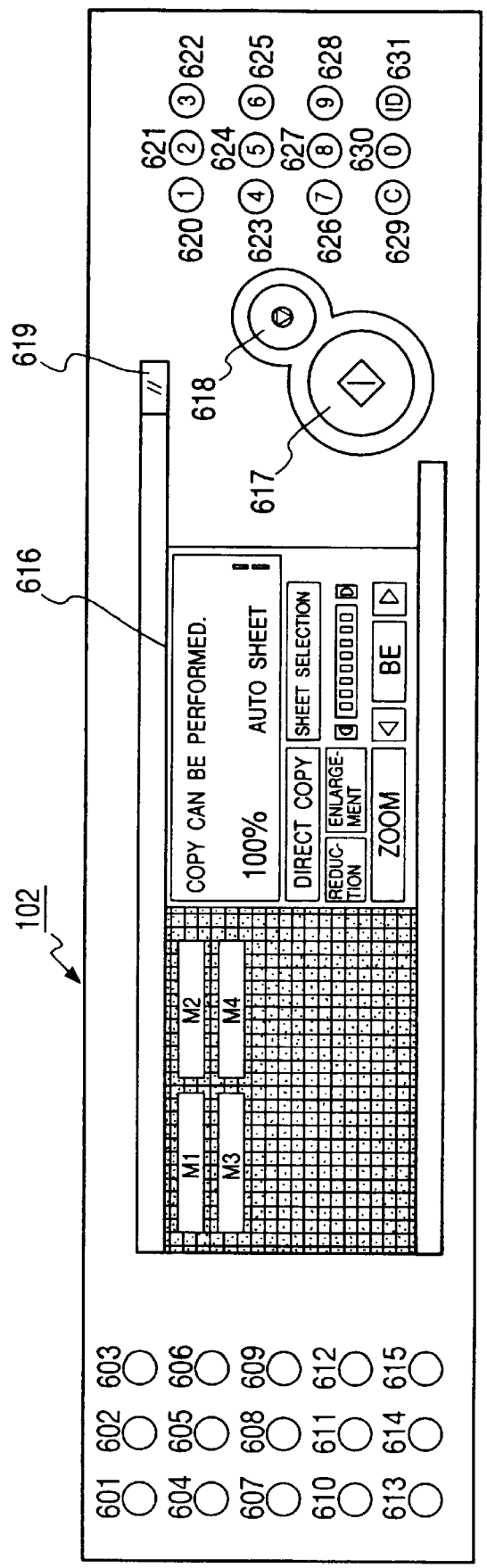
FIG. 6 is a view for explaining an operation unit 102 of the color copying machine of this embodiment.
Figure 7B:
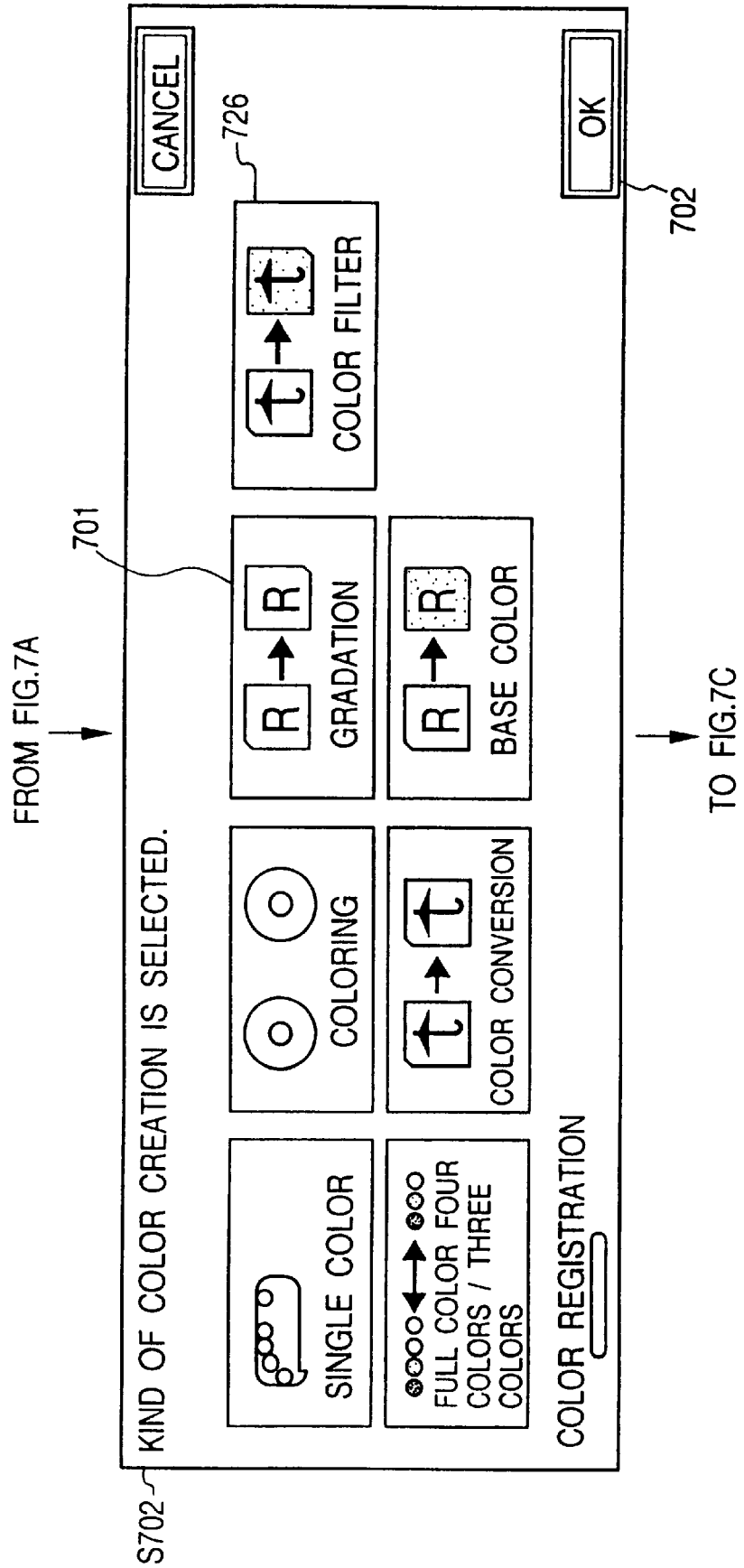
FIG. 7 is comprised of FIG. 7A to FIG. 7G showing views for explaining changes in display screen of a liquid crystal display unit 616 in a gradation paint setting mode.
Figure 7D:
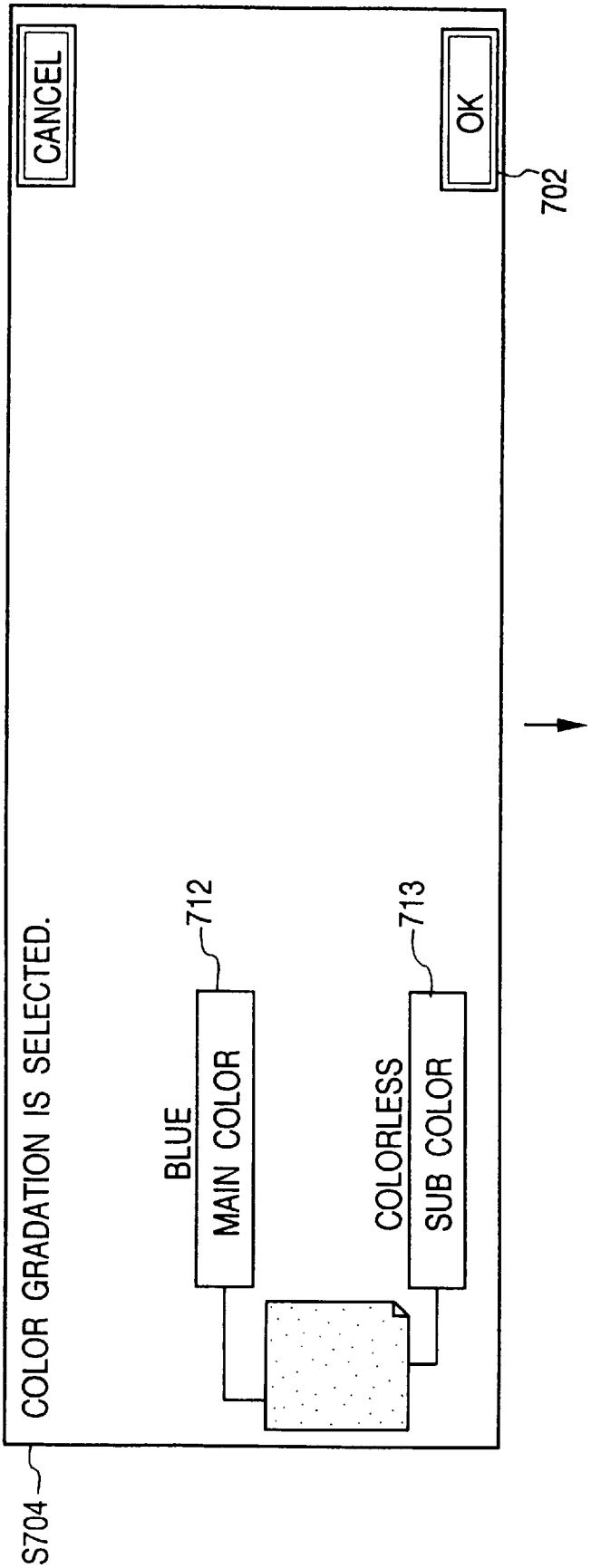
Figure 7G:
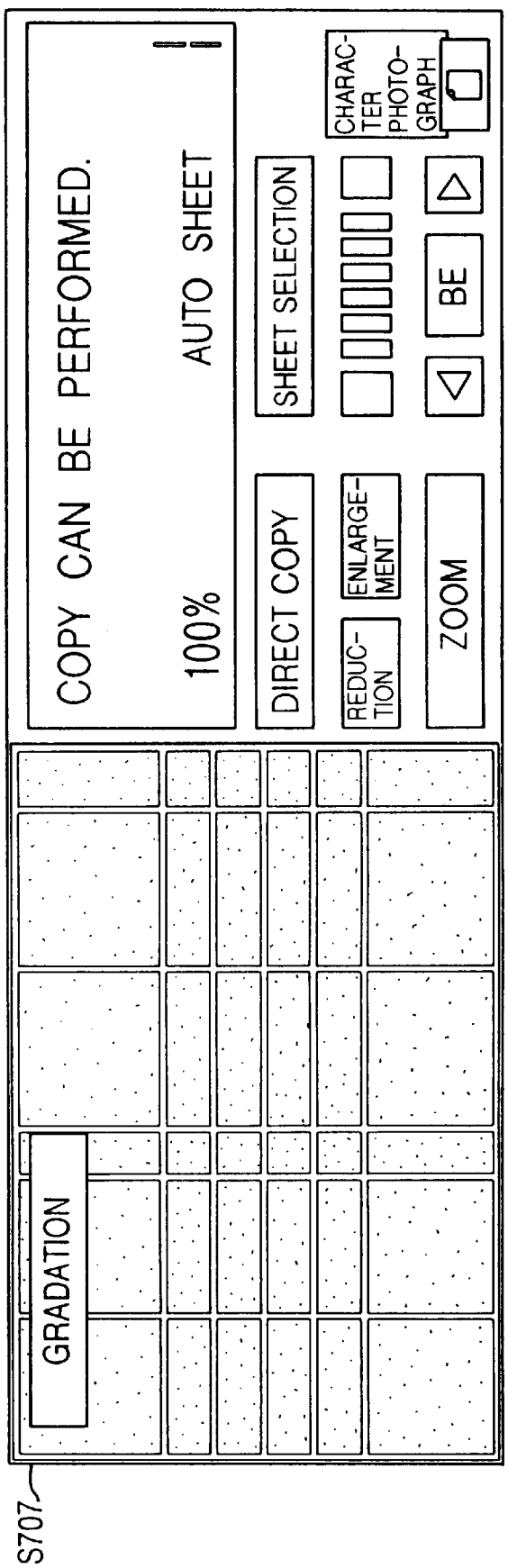

FIG. 6 is a view for explaining the operation unit 102 of the color copying machine of this embodiment.

Referring to FIG. 6, the operation unit 102 comprises keys 601 to 615 for setting various operation modes. Of these keys, the key 606 is a color creation key. LEDs are arranged in the key portions to be turned on when the corresponding keys are operated.

A liquid crystal display unit 616 has a touch panel on its upper surface. It is possible to create soft keys on the screen.

The operation panel 102 also includes a start key 617, a clear/stop key 618, a reset key 619, and numerical input ten keys 620 to 631.

A method of operating the operation unit 102 to set a gradation paint mode will be described with reference to FIGS. 7A to 7G.

FIGS. 7A to 7G are views for explaining changes in display screen of the liquid crystal display unit 616 in the gradation paint setting mode.

When the color creation key 606 is depressed on the screen in the initial state in step S701, the screen state of the liquid crystal display unit 616 changes to a screen state in step S702.

When a gradation key 701 of the seven function keys is operated in step S702, the screen state changes to a screen state in step S703.

In step S703, an object to be painted with gradation is selected using an image (an image portion with gradation) key 703 and a background (a background portion with gradation) key 704. At the same time, the direction of gradation is also selected with seven kinds of function keys (keys 705 to 711). When an OK key 702 is operated, the screen state changes to a screen state in step S704. Note that the keys 705 to 711 correspond to gradation examples shown in FIGS. 5A to 5G, respectively.

When the main color key 712 is operated in step S704, the screen state changes to a screen state in step S705, and five keys, i.e., a number selection key 714 for a method of designating a color, a designation color key 715 (for selecting an arbitrary color from the original), a registration color key 716 (for selecting a given registered color), a color circle key 717 (for selecting a color from a color circle), and an original color key 718 (designating an original color itself) appear.

Note that the main color is the start color of gradation, and that the subcolor is the end color of gradation.

Figure 8:
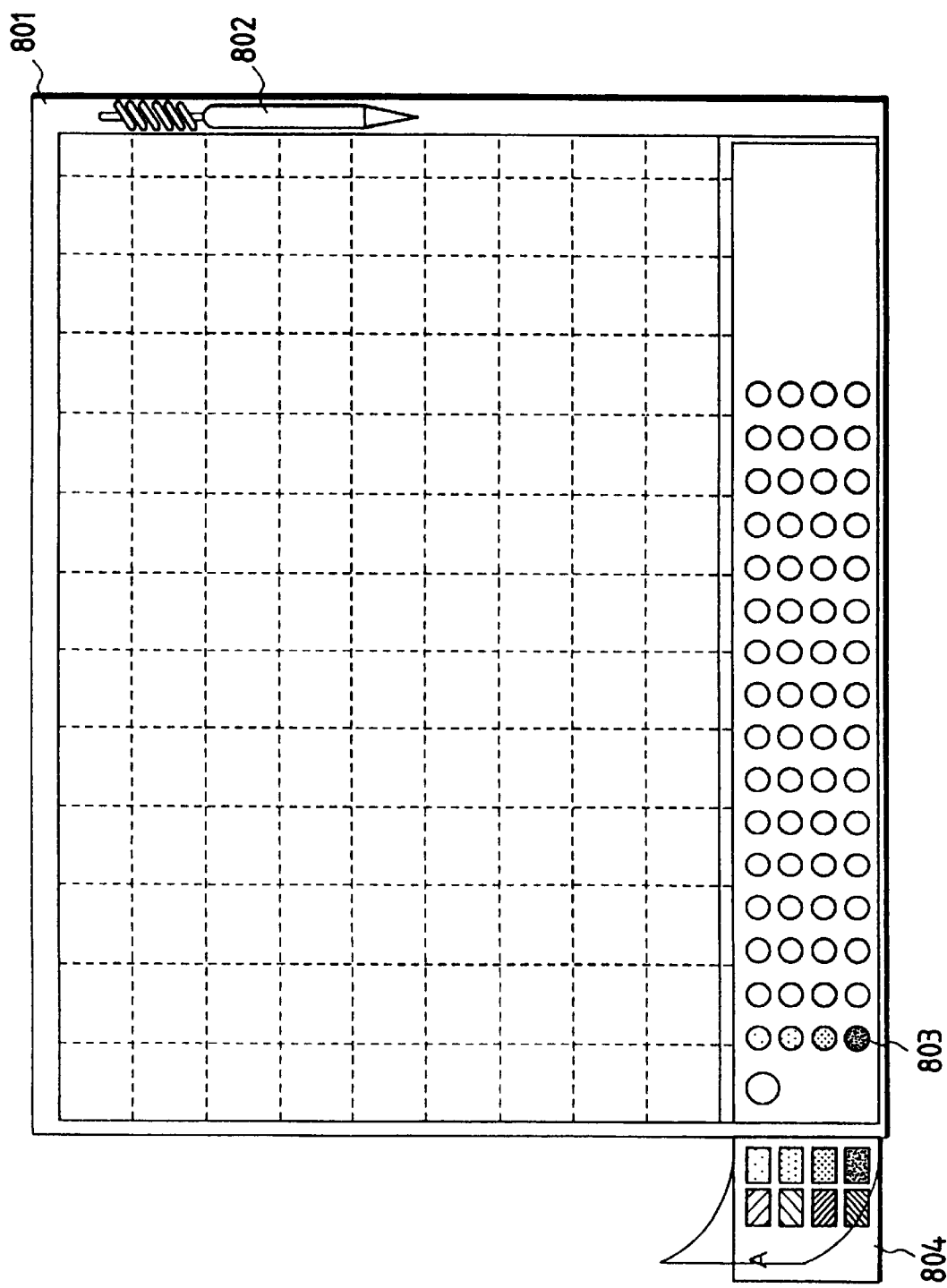
FIG. 8 is a schematic view of a digitizer.

One color is selected from the color palette of a digitizer shown in FIG. 8.

The digitizer in FIG. 8 includes a digitizer main body 801, a point pen 802, and a color palette 803.

The color palette portion is adapted to receive a color chart 804 in a slit. The color chart 804 can be exchanged to designate a color in a user mode (not shown). Alternatively, a user can create and use a personal color chart. The digitizer 801 has coordinates in the color palette portion, and a palette portion of a color to be selected is depressed with the point pen of the digitizer to determine a color number assigned to each color according to the detected coordinates, in addition to normal coordinate designation.

As a color designation method, the number selection key 714 can be operated to directly input a number from the operation unit 102.

Note that when no color is selected, the same processing as in selecting "colorless" (white) is performed.

When a color is selected, the screen state changes to a screen state in step S706, and a subscreen 719 indicating the percentage of each component C, M, Y, and Bk of the selected color is automatically displayed. When fine adjustment is to be performed, a fine adjustment key 720 is operated to change the percentage, and an OK key 721 is operated to set the finely adjusted color. If no fine adjustment is required, the OK key 721 is directly depressed. When the OK key 721 is operated, the screen state returns to the screen state in step S705, and subcolor selection is performed in the same manner as in the method of setting the main color. When color selection is completed, the screen state returns to the screen state in step S705. When the OK key 702 is operated on the screen state of step S705, the screen state changes to the screen state in step S707, thereby completing gradation setting.

Note that when the cancel key at the upper right corner of each screen state is operated, the previous screen state is restored.

Fine designation will be described below.

Figure 5D:
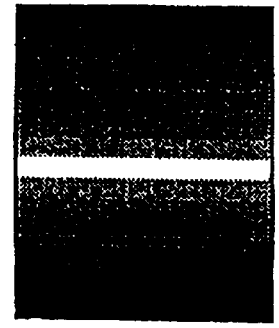
FIGS. 5A to 5G are views for explaining gradation paint examples, respectively.
Figure 5C:
Figure 5G:
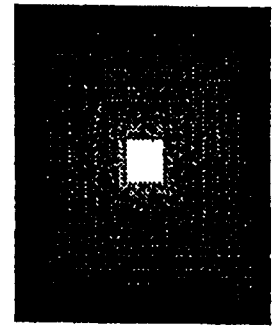
Figure 5B:
Figure 5F:
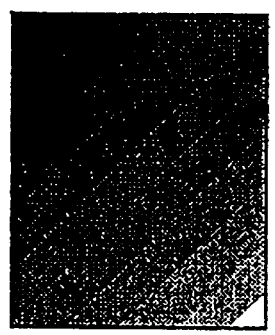
Figure 5A:
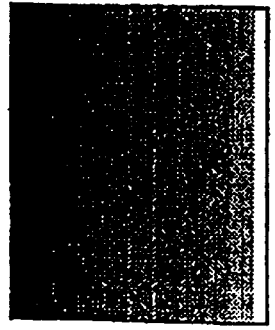
Figure 5E:
Figure 9A:
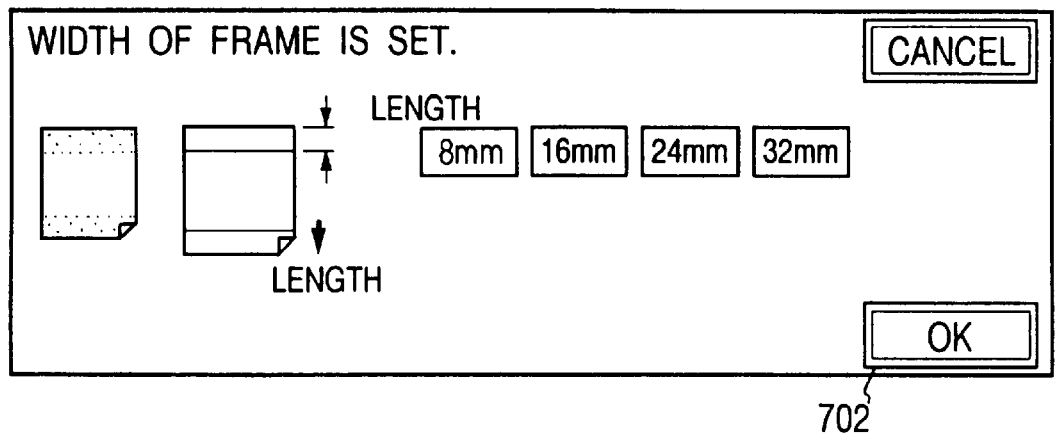
FIGS. 9A to 9C are views for explaining the display screen of the liquid crystal display unit 616 upon operation of a frame key 722.
Figure 9B:
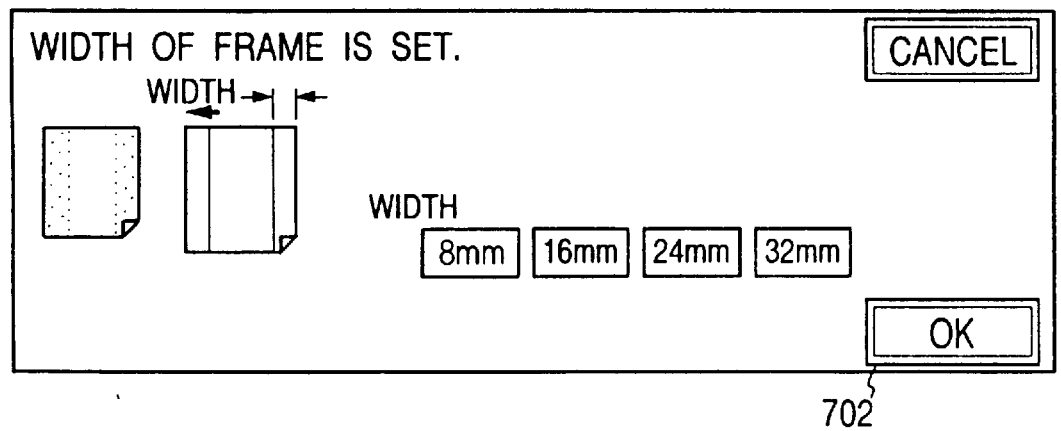
Figure 9C:
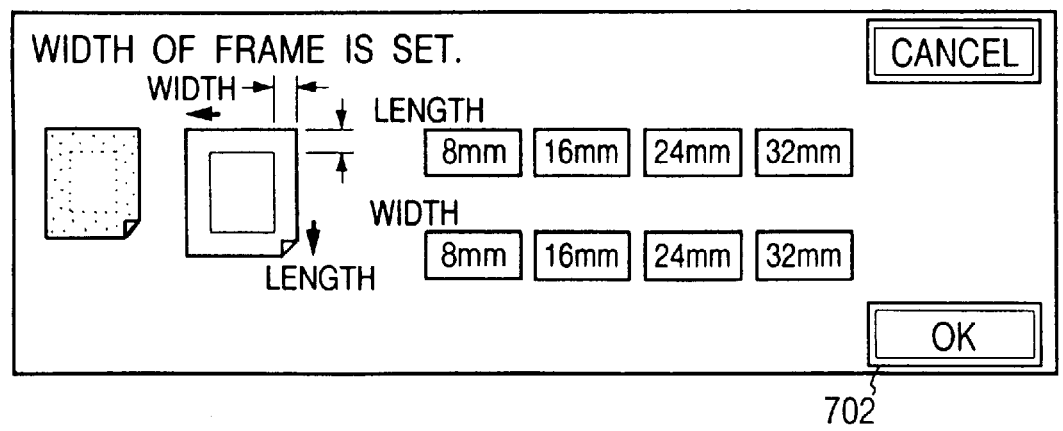

Assume that the state in any one of FIGS. 5C, 5D, and 5G is selected as the kind of gradation in step S703. When a frame key 722 is operated, a screen state of a corresponding one of FIGS. 9A to 9C is displayed in corresponding to this selection. In this screen state, a gradation (frame) which changes from the main color to the subcolor and vice versa in a narrow width can be set. The width of change (width of a frame) can be selected from 8 mm, 16 mm, 24 mm, and 32 mm independently in the vertical or lateral direction. Note that when the OK key 702 is operated on the screen state shown in FIG. 9A, 9B, or 9C, the screen state changes to the screen state in step S704 of FIG. 7D.

Figure 10A:
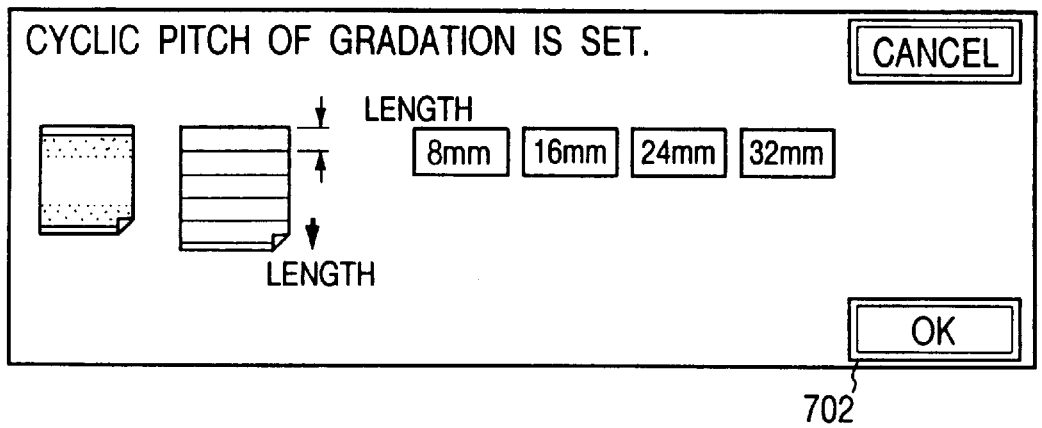
FIGS. 10A to 10C are views for explaining the display screen of the liquid crystal display unit 616 upon operation of a repeat key 723.
Figure 10B:
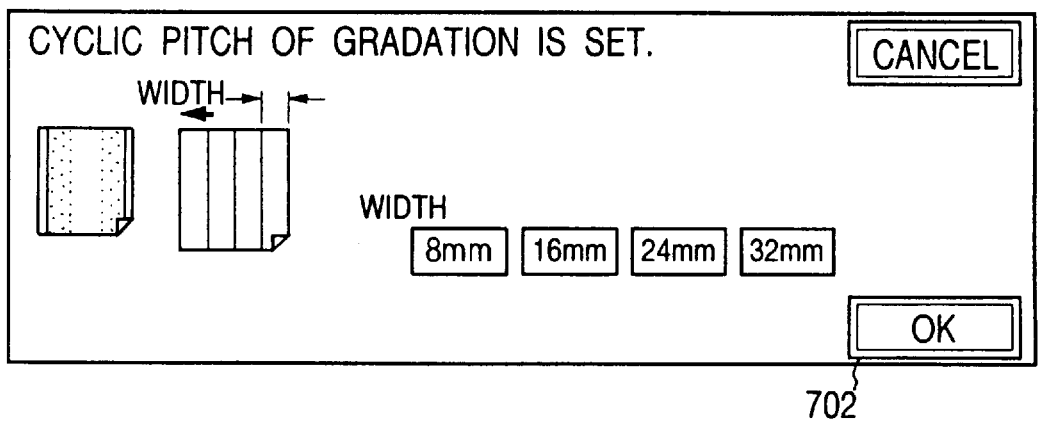
Figure 10C:
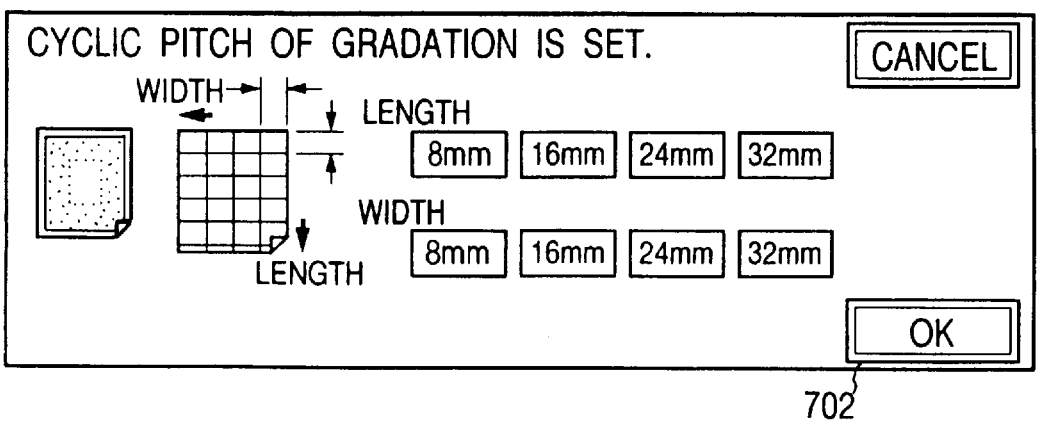

Assume that a screen state of any one of FIGS. 5C, 5D, and 5G is selected as a kind of gradation. In this case, when a repeat key 723 is operated, a screen state of a corresponding one of FIGS. 10A to 10C is displayed in corresponding to this selection.

In this screen state, a gradation pattern which repeatedly changes from the main color to the subcolor and vice versa can be set. The repetition pitch can be selected from 8 mm, 16 mm, 24 mm, and 32 mm independently in the vertical or lateral direction. Note that when the OK key 702 is operated on the screen state shown in FIG. 10A, 10B, or 10C, the screen state changes to the screen state in step S704 of FIG. 7D.

Figure 11:
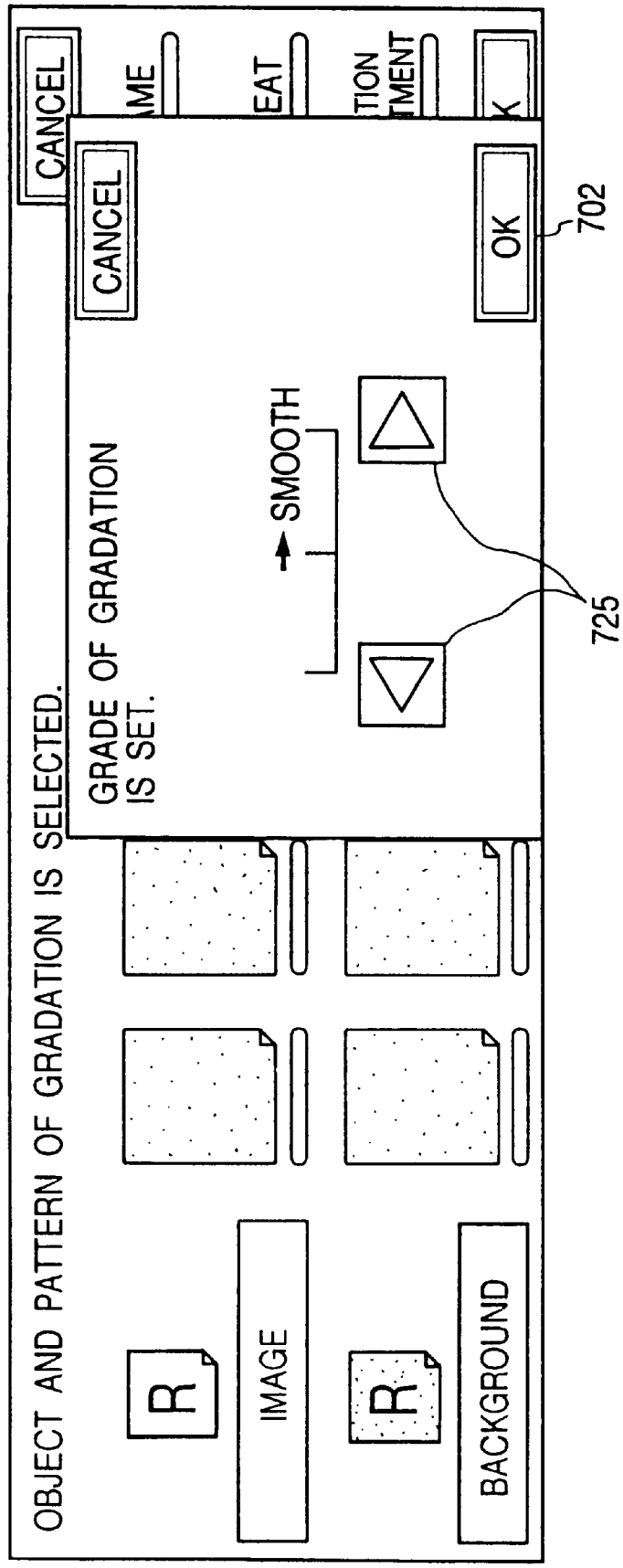
FIG. 11 is a view for explaining the display screen of the liquid crystal display unit 616 upon operation of a gradation adjustment key 724.

When a gradation adjustment key 724 is operated after the kind of gradation is selected in step S703, the screen state in FIG. 11 is displayed. In this screen state, an operation key 725 is operated to allow smoothness of a change in gradation in three steps. Note that when the OK key 702 is operated on the screen state shown in FIG. 11, the screen state changes to the screen state in step S704 of FIG. 7D.

The above-described three settings need not always be performed. As another example, when a color filter function for performing filter-like transparent painting of an image using a fixed synthesization ratio is to be executed, a color filter key 726 is selected on the screen state of step S702, and a paint color and a synthesization ratio are set. A method of selecting a color is the same as that of gradation paint.

Second embodiment is now described hereinafter.

In the above embodiment, various kinds of images can be created by the above settings, but operations are undesirably complicated. To solve this problem, it is convenient to set these operations with default values in advance and then set these values with one key.

In the second embodiment, a "blue back mode" is set for creating a presentation reference. Images (FIGS. 12A to 12C) frequently used for slides can be easily obtained without performing cumbersome settings.

A detailed method of setting hardware of the second embodiment is the same as that of the first embodiment, and a detailed description thereof will be omitted.

FIGS. 13A to 13D are views for explaining changes in display screen of a liquid crystal display unit 616 in the blue back mode of the second embodiment.

When a color creation key 606 is depressed in the screen in the initial state in step S1001, a screen state changes to a screen state in step S1002. In the screen state of step S1002, when a blue back key 1001 is operated, the screen state changes to a screen state in step S1003.

Figure 12A:
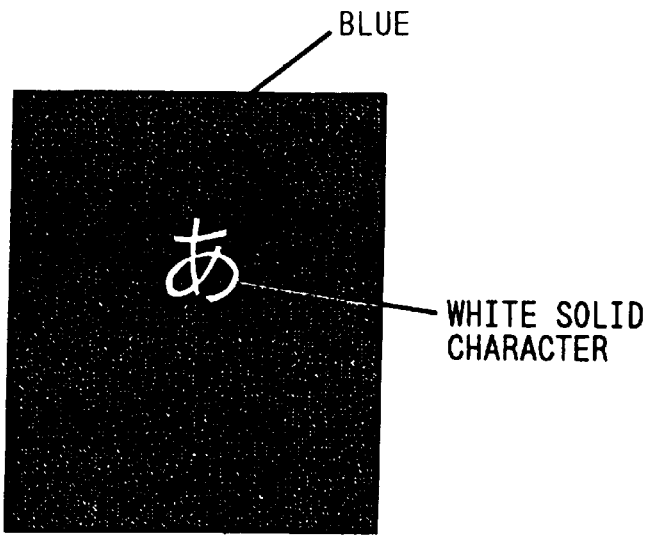
FIGS. 12A to 12C are views for explaining image examples created in the second embodiment.
Figure 12B:
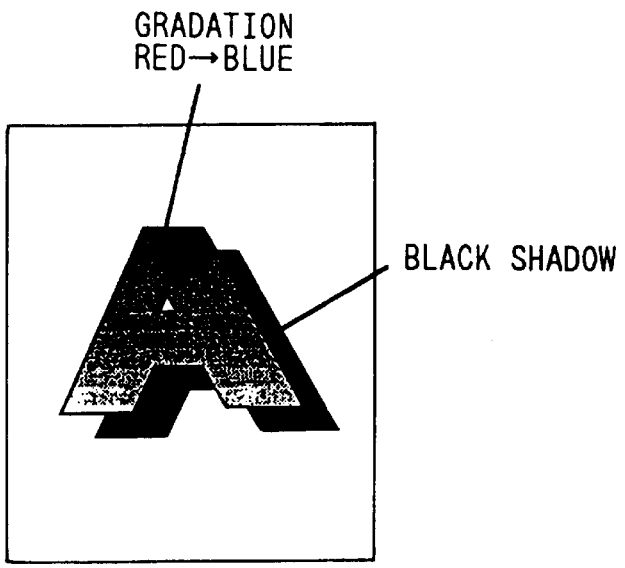
Figure 12C:
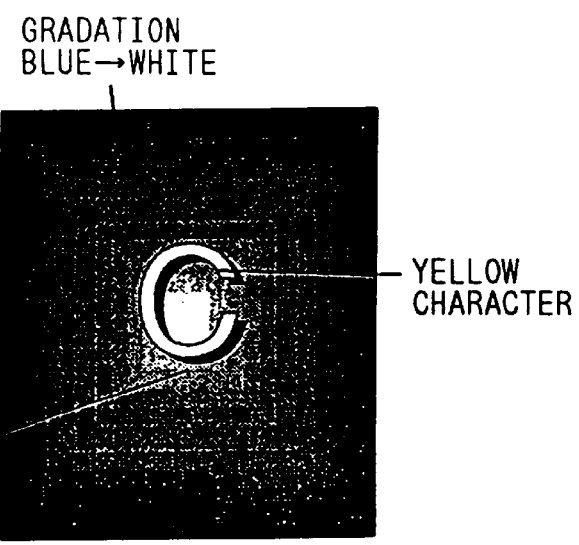

In step S1003, one of a plurality of combinations of functions prepared in advance is selected. In this case, one of the three combinations shown in FIGS. 12A to 12C is selected. The combinations in FIGS. 12A to 12C correspond to keys 1004, 1005, and 1006, respectively. Upon selection of one of the combinations, an OK key 1003 is depressed to complete setting of the blue back mode.

With this operation, settings for modifying a character with a shade and an outline and painting the background with gradation can be completed. For this reason, advanced functions can be used with easier operations.

Note that, in addition to this setting method, various methods can be proposed such that the resultant image examples are attached as samples and the samples are numbered and input with key operations, and that bar codes are assigned to images and these images are read with the bar codes. Alternatively, a new pattern may be added using an IC card (not shown) and downloaded to and used in a main body.

Note that a copying machine has been exemplified in each embodiment described above. The image editing technique having the above arrangement is also applicable to a color facsimile machine, a color printer, a video camera, and the like, as a matter of course. That is, the above embodiments are merely examples and will not limit the spirit and scope of the present invention.

According to one embodiment as described above, when the first and second image signals are to be synthesized, an image area is designated, and the first and second image signals can be synthesized while controlling their synthesization ratio. For this reason, advanced image editing functions such as transparent paint and gradation paint for a specific area, which functions have not been realized in conventional image editing, can be performed.

According to one embodiment, an image processing apparatus comprises a first input means for inputting an image signal, a second input means for inputting a signal representing a first specific color, a third input means for inputting a signal representing a second specific color, a first synthesizing means for synthesizing the signals representing the first and second specific colors while controlling a synthesization ratio thereof, and a second synthesizing means for synthesizing the image signal with an output signal from the first synthesizing means. Therefore, gradation paint as one of advanced image editing functions, which has not been realized in conventional image editing, can be performed.

According to one embodiment, an image processing apparatus comprises a first input means for inputting an image signal, a second input means for inputting a signal representing a specific color, and means for synthesizing the image signal with the signal representing the specific color while controlling a synthesization ratio thereof. Therefore, transparent paint as one of advanced image editing functions, which has not been realized in conventional image editing, can be performed.

According to one embodiment, an image processing apparatus comprises a first input means for inputting a first image signal, a second input means for inputting a second image signal, means for synthesizing the first and second image signals while controlling a synthesization ratio thereof, and print means for printing an image signal synthesized by the synthesizing means. Therefore, two image signals can be synthesized at various synthesization ratios and a synthesized image can be printed. This function is one of advanced image editing functions, which has not been realized in conventional image editing.

According to one embodiment, an image processing apparatus for performing image processing using a specific color selected by a selecting means comprises a display unit arranged in the selecting means to display a soft key, and a control unit for displaying, on the display unit, a first soft key for selecting a color or a second soft key for finely adjusting a color selected by the first soft key, wherein the control unit causes the display unit to display the second soft key in accordance with selection of the color selected by the first soft key. Therefore, operability for selecting a color in image processing can be improved, thereby providing a convenient image processing apparatus.

According to one embodiment, an image processing method performs image processing using a soft key displayed on a display unit, wherein a soft key for performing fine adjustment of the selected color is displayed on the display unit in accordance with an operation of a color selection soft key. Therefore, operability for selecting a color can be improved, thereby providing a convenient image processing apparatus.

Various changes and modifications can be made without departing from the spirit and scope of the present invention.

For example, a copying machine has been exemplified in each embodiment described above. The image editing technique having the above arrangement is also applicable to a color facsimile machine, a color printer, a video camera, and the like, as a matter of course. That is, the above embodiments are merely examples and will not limit the spirit and scope of the present invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
    a) a scanner for scanning an original image;
    b) a first setting means for setting a signal representing a first specific color by using an operation unit;
    c) a second setting means for setting a signal representing a second specific color by using the operation unit;
    d) a first synthesizing means for synthesizing the signals representing the first and second specific colors while changing a synthesization ratio according to a pixel position of process pixel in an output image, and thereby generating a gradation image changing from the first specific color to the second specific color;
    e) a second synthesizing means for synthesizing the original image with the gradation image from said first synthesizing means; and
    f) an image forming means for forming the image synthesized by said second synthesizing means on a recording medium.

2. An apparatus according to claim 1, further comprising a third setting means for setting a gradient of the gradation image by using the operation unit.

3. An apparatus according to claim 1, further comprising a fourth setting means for setting a gradation method of the gradation image.

4. An apparatus according to claim 1, wherein said image forming means uses an electrophotography method.

5. An apparatus according to claim 1, wherein said first and second setting means input a color signal indicating the first and second specific colors by using a digitizer.

* * * * *

UNITED STATES PATENT AND TRADEMARK OFFICE
CERTIFICATE OF CORRECTION

PATENT NO.    : 6,097,510
DATED         : August 1, 2000
INVENTOR(S)   : AKIKO KANNO ET AL.

It is certified that error appears in the above-identified patent and that said Letters Patent is hereby corrected as shown below:

ON THE TITLE PAGE:

[57] ABSTRACT

Line 3, "ration" should read --synthesizing ratio--.

Signed and Sealed this

Twenty-second Day of May, 2001

Attest:

NICHOLAS P. GODICI

Attesting Officer

Acting Director of the United States Patent and Trademark Office